Dec. 26, 1967         J. O. JEFFREY ET AL         3,359,815
POWER TRANSMISSION CHAIN LINK PLATE
Filed Sept. 26, 1963                          2 Sheets-Sheet 2
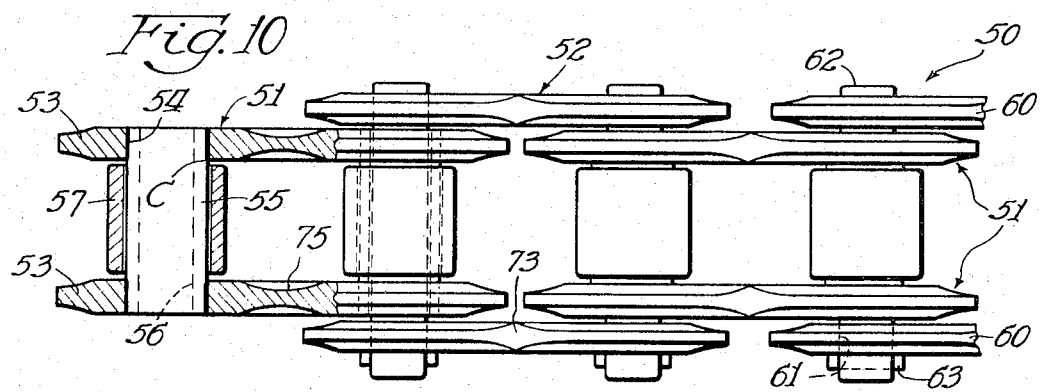
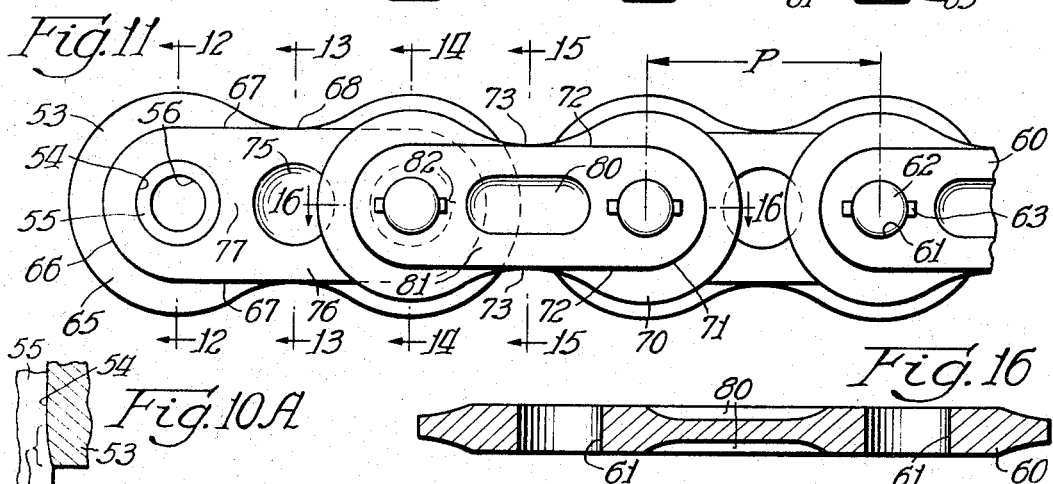
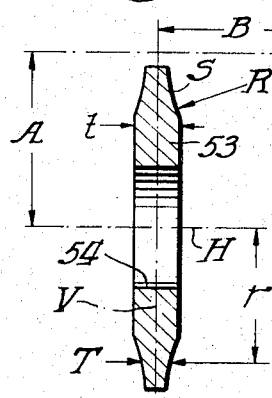
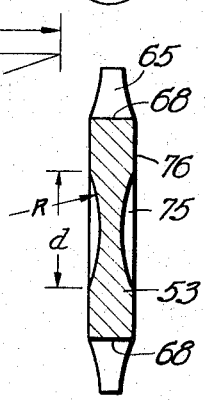
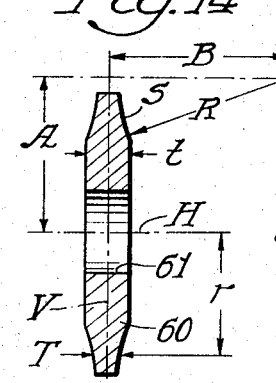
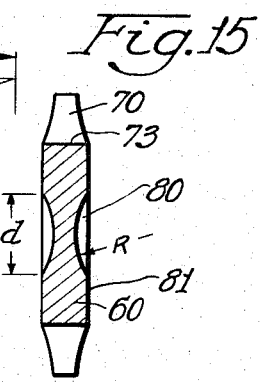
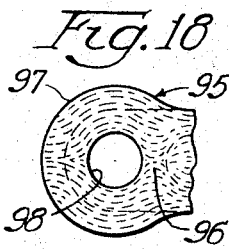
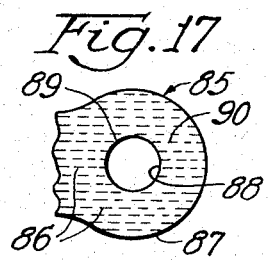
Inventors:
Joseph O. Jeffrey
Elmer D. Robinson
John R. Mueller and
Myron Hawley
By: Evan D. Roberts Atty.

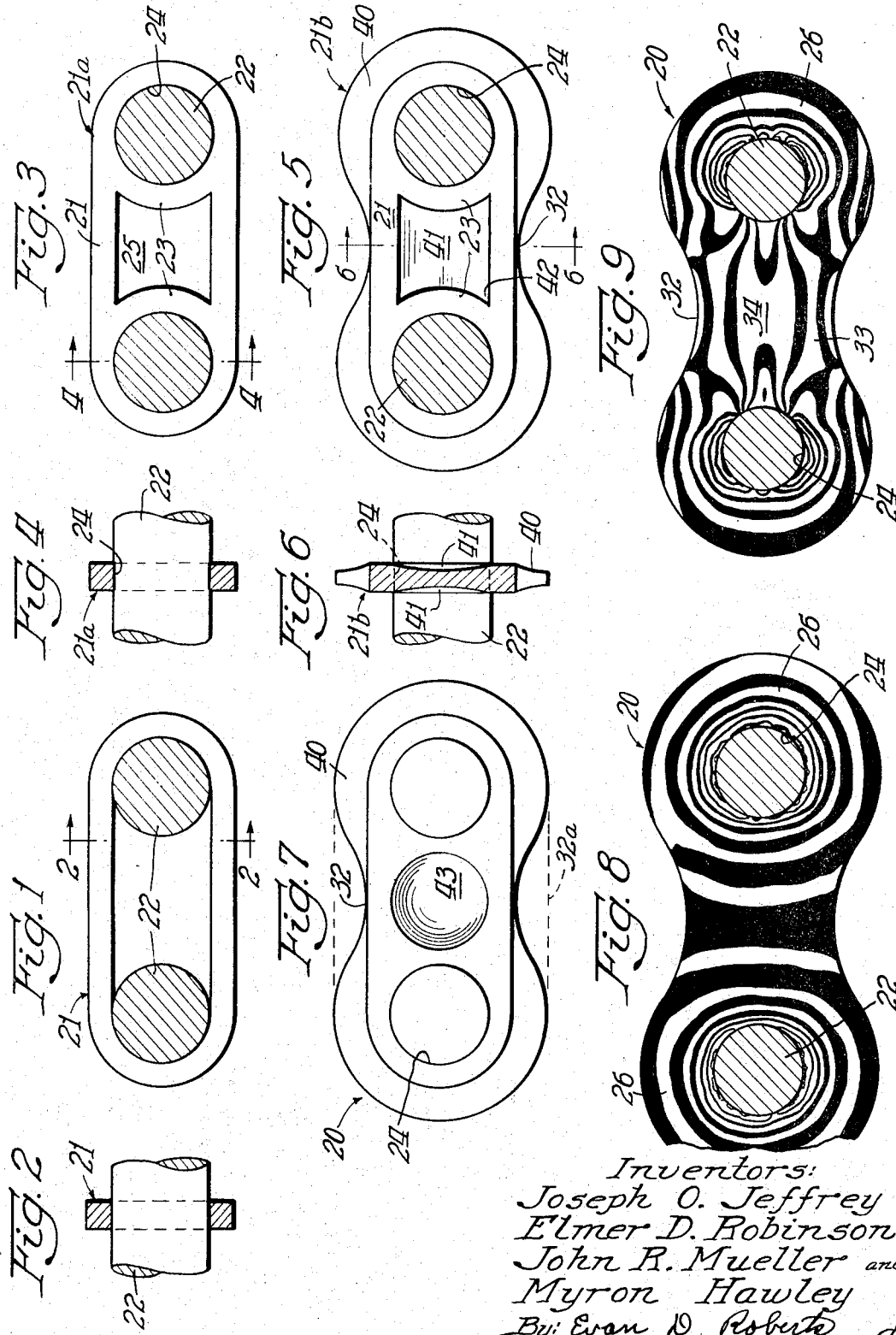

United States Patent Office 3,359,815
Patented Dec. 26, 1967

3,359,815
POWER TRANSMISSION CHAIN LINK PLATE
Joseph O. Jeffrey, Ithaca, N.Y., Elmer D. Robinson, Greenville, Miss., John R. Mueller, Denver, Colo., and Myron Hawley, Wilmerding, Pa., assignors to Morse Chain Company, Ithaca, N.Y., a corporation of New York
Filed Sept. 26, 1963, Ser. No. 311,827
2 Claims. (Cl. 74—250)

This invention relates to a power transmission chain link plate of the type commonly used in roller chains and in particular to a link plate having a predetermined shape and configuration for providing an optimum strength-to-weight ratio for the link plate. The high strength-to-weight ratio of the contemplated link plate derives not only from its physical shape but also from the forming process used in its manufacture in which the internal grain structure of the metal comprising the plate is oriented directionally to most effectively resist the applied service forces created within the link plate when the chain is transmitting power.

In service, the power transmission capacity of a roller chain is limited under different circumstances by any one of the following five possible types of failure:

(a) Excessive wear between the pin and bushing, occurring on both of these components. This wear ultimately results in so much chain elongation that the pitch of the chain becomes mismatched with the pitch of the sprockets on which it is running, to such an extent that the drive becomes inoperative and the chain can be said to have "failed" because it can no longer properly perform the function for which it was designed.

(b) Fracture of link plates by "fatigue" which causes the chain to break after a limited number of cycles of load application. Plate fatigue failure usually is nucleated on the surface of one of the plate apertures where stresses are highly concentrated, and a crack propagates from the aperture toward the outer periphery of the plate until this section becomes so small that it can no longer carry the load whereupon a sudden complete break-through results. Occasionally this fatigue type of failure is nucleated at the outer edge of the waist of the plate which is subjected to higher stresses than its interior, and a crack is propagated across this section; fracture ultimately occurring through the waist when its cross-section has been reduced by the propagating crack to an area incapable of carrying the load.

(c) Roller or bushing fracture by "fatigue" which limits roller or bushing life due to impact shock-loading resulting from engagement with the sprockets. Cracks nucleated at the roller (bushing) edges ultimately propagate across the section causing the roller (bushing) to break and fall off the chain. When adjacent rollers (bushings) have thus fallen free of the chain, the drive becomes so rough that the chain must be replaced.

(d) Pin-bushing "galling." This type of failure is characterized by extremely rapid wear of the pin and bushing surfaces possibly terminating by the freezing or seizure of these components in the chain. The immediate cause of galling is a break-down of the fluid film of lubricant that would normally separate the bearing surfaces, as a consequence of which heat is generated faster than it can be dissipated, metal particles are rapidly torn from the bearing surfaces, and with sufficient temperature-rise the surfaces virtually weld together. Galling conditions may be initiated by operating the drive at excessive speeds, or without adequate lubrication, or without proper provision for dissipating the heat generated within the chain. A forewarning of this type of chain failure is always afforded by a high temperature-rise of the drive.

(e) Impact or shock over-loads, which result in a sudden tensile failure of the chain by pin fracture. Such loading is usually inadvertent or accidental, and may be exemplified by the sudden engagement of a clutch, or by the wedging of a hard rigid object into the drive causing it to jam. When the energy absorption capacity of the drive is exceeded, the weakest component in the system breaks; this could be a shaft, sprocket key, or a pin in the chain. Drive applications liable to shock over-loads should be protected by torque limiters, shear pins, etc.

Because each of these modes of failure is directly related to the mass of the chain itself and the configuration of the plates thereof, the inventors found that the power transmission capacity of a chain can be enhanced by reducing the weight of the chain providing this weight reduction is effected without sacrificing any of the mechanical properties of the component whose mass has been altered to reduce the weight and improve the plate configuration. It is therefore the basic object of this invention to reduce the chain weight by creating a chain link plate, whose design is applicable to all types of roller chain plates, having a scientifically calculated distribution of its mass to provide a chain link plate configuration of lighter and more trim character, resulting in a plate (a) having superior fatigue characteristics, (b) capable of allowing freer access of the lubricant to the bearing surfaces of the pin and bushing, (c) whose interaction with the contained press-fitted bushing reduces bushing distortion (barrelling) thereby effecting a more uniform bearing pressure between the pin and bushing to further contribute to diminished wear between these components; said link plate configuration being capable of economical fabrication in a fashion whereby the grain orientation in the metal thereof is ideally suited to resist the forces applied to the plate in service.

Before enumerating the specific objectives also incorporated in this invention, the following explanation is presented in support of statements made in stating the basic objective above.

For a given linear velocity of a power transmission chain, lighter chain weight reduces the centrifugal tension in the chain, consequently the net useful chain pull can be correspondingly raised without increasing the maximum force the plates are required to transmit. In addition, the proposed link plate configuration provides a novel distribution of the limited material therein, on which a preferred grain orientation may be conferred in fabrication, to make the plate capable of transmitting significantly larger forces without fatigue failure than the conventional flat plate now commonly blanked or punched out of strip stock. Thus the lower chain mass, plate configuration and grain orientation all operate to elevate the power transmission capacity of the chain without failure by plate fatigue.

The impact of the rollers and bushings upon engagement with the sprockets of a power transmission drive is directly proportional to the mass of the chain running at a given speed. Because the contemplated link plate configuration reduces the chain weight by approximately ten percent, the fatigue life of the rollers will be improved due to the reduced cyclic shock loads applied to the rollers assuming the lineal velocity of the chain is not altered. In fact, roller fatigue failures will be virtually eliminated in those cases in which the lower chain mass reduces the cyclic loading on the rollers to a level below their fatigue endurance strength. In other words, the lighter chain can be run at higher speeds and/or higher useful loads before reaching its capacity to resist failure by roller impact fatigue.

Wear of the bushing and pin surfaces causes the pitch of a roller chain to become elongated, ultimately requiring replacement of the chain when its increased pitch cannot be accommodated by the sprockets on which it is running. These wear rates are dependent on a number of factors among which are: the nature of the lubricant and its ability to be introduced into the region between the pin and bushing, the clearance between pin and bushing, the nature (smoothness, hardness, etc.) of the bearing surfaces, the maximum pressure (chain pull per square inch of bearing area) and its distribution over the bearing area, and the speed of the chain. By changing the link plates of the chain from the conventional flat plate of uniform thickness to the inventors' lighter plate of the contemplated configuration, the following factors controlling bearing performance will be altered to reduce the wear rates and chain elongation:

(a) The configuration of the plate allows easier access of the lubricant to enter the clearance space between the bushing and pin thereby providing a more abundant supply of lubricant to the bearing surfaces; (b) running at a given speed and transmitting a specified horsepower, the maximum chain load (composed of useful load plus centrifugal tension) will decrease as the chain mass is reduced because the centrifugal tension is lower, hence bearing pressures are smaller and there is a reduced tendency for the lubricant to be squeezed out of the clearance region between the pin and bushing; (c) the particular configuration selected for the roller link plate is such that the plate does not have to exert as large a radial force around the periphery of the contained bushing in order to develop the optimum prestress pattern around the hole in the plate, as a consequence of which the bushing is not as highly squeezed at its ends, which means that the bushing remains more nearly a hollow cylinder of uniform diameter from end to end. Thus, because the bushing is not as severely "barrelled," the bearing pressure between pin and bushing is more uniform and is not highly concentrated at the ends of the bushing. This consequently operates to minimize wear between pin and bushing.

Having stated the basic object of this invention, attention is directed to the following particular objectives which are incorporated by the unique distribution of mass in the proposed chain link plate, and by the preferred grain orientation therein resulting from the fabrication process employed in the manufacture of the plate.

It is a particular object of this invention to create a roller chain link plate having an optimum strength-to-weight ratio.

More particularly, an object of this invention is to create a roller chain link plate having a predetermined configuration which distributes the material thereof in the most desirable and scientifically, substantiated, correct fashion to achieve a high strength-to-weight ratio.

Another object of this invention is to create a roller chain link plate wherein buttressing material is provided in several regions of the plate to augment its strength and fatigue resistance thereby utilizing all of the material to the best possible advantage and obtaining the maximum power transmission capacity from the material contained in the plate.

A further object of this invention is to create a roller chain link plate in which all the material thereof is stressed as nearly as possible to the highest level, i.e. lightly loaded regions have thinner sections to elevate the stresses therein to the same level as the stresses in regions of high service loads where thicker sections are necessary to prevent these stresses from exceeding the allowable strength limit for the material.

Another object of this invention is to provide a roller chain link plate having a cross-sectional configuration such that the martensitic phase transformation occurring during quenching in the heat treatment thereof will tend to leave favorable residual compressive stresses surrounding the apertures after cooling thereby enhancing the capacity of the plate to resist fatigue failure. Since the plate has a variable cross-section, being thickest around the apertures and tapering radially outward from the thickest portion, the thinner tapered outer portions will have cooled and become relatively rigid during quenching while the heavier section around the holes is passing through the martensite transformation temperature range. Because this phase transformation is accompanied by an expansion of the material transforming, the region around the apertures will be left with residual compressive stresses after the plate has cooled to ordinary temperature. Such stresses are favorable in that they enhance the fatigue resistance in this region which is critical in the initiation of fatigue cracks. The functions of residual compressive stresses and of prestressing with circumferential tensile stresses around the apertures will be more fully described later.

Another particular object of this invention is to create a roller chain link plate having a configuration which provides novel bell-mouthed apertures therein produced by drifting the holes thereof in the conventional manufacturing process thereby setting up an optimum residual stress distribution pattern transversely across the plate thickness on the aperture surfaces with the highest favorable prestress being positioned on the aperture edges and diminishing gradually inwardly therefrom.

A further object of this invention is to create a roller chain link plate having a configuration which provides novel bell-mouthing of the apertures thereof when a pin or bushing is press-fitted therein to an extent that a significant reduction of the high stress concentration is effected on the edges of the apertures where fatigue failures of the link plates are usually nucleated.

Another object of this invention is to provide a roller chain link plate and a chain constructed therefrom having dimensions and mechanical properties that will conform in all respects to the specifications and requirements therefor as stipulated by associations and societies who have established dimensional and quality standards for roller chain and its components, thereby allowing interchangeability with existing standard roller chain sprockets and power transmission drives, and being lighter and possessing improved and superior load-carrying capacity, wear and fatigue resistance.

A further object of this invention is to provide a roller chain link plate which is somewhat more resilient than the conventional plate, thereby obtaining a smoother and quieter performing chain with greater resistance to impact loads, but which retains sufficient rigidity to maintain nominal dimensional stability.

An additional object of this invention is to create a roller chain link plate having a predetermined configuration which, by comparison with conventional plates of uniform cross-section, allows easier access of the lubricant to enter the clearance space between the pin and bushing thereby providing a more abundant supply of lubricant to the bearing surfaces.

Another object of this invention is to create a chain link plate having novel features which are directly applicable to pin link plates, roller link plates, center plates, connecting link plates, and are further combined to include "offset" or "cranked" link plates and all standard or special assemblages thereof including, among others, multiple strand chain assemblies.

An additional object of this invention is to provide a roller chain link plate which when formed by a forging operation provides a grain orientation in the metal thereof which is substantially coincident with the pattern or lines of stress flow created within the chain link plate under service loading thereby providing the greatest capacity of the plate to resist failure especially from fatigue and impact.

With these and other objects in view, the present invention contemplates a roller chain link plate having a novel optimum configuration wherein the principal load-carrying portions of the plate are reinforced by sections of metal of diminishing cross-section particularly selected to buttress these heavily loaded regions thereby providing an optimum stress distribution resulting in a chain link plate which is interchangeable with existing plates and conforms dimensionally to all standard specifications therefor but which possesses a higher power transmission capacity in relation to the mass of material contained therein, said contemplated configuration being sufficiently simple and symmetrical to permit its economical manufacture by existing known methods, and allowing such plates to be assembled together with other standard components into a roller chain without alteration of assembly machines or methods; said contemplated chain link plate having a configuration particularly adapted for further enhancement of load-carrying capacity when formed by a process which confers, in its internal structure, a preferred grain orientation that is coincident with the stress-flow pattern of the plate when subjected to operating loads.

Other objects, advantages and novel aspects of this invention will become apparent upon the following detailed description in conjunction with the accompanying drawings wherein FIGURES 1–6 represent the underlying concepts of this invention, FIGURES 8 and 9 illustrate photoelastic model fringe patterns, FIGURES 17 and 18 show grain orientations, and the remaining figures represent specific manifestations of the invention. In particular:

FIG. 1 is a side view of two connecting pins of a chain showing a simple band plate wrapped around the pins for transmitting force between them.

FIG. 2 is a cross-sectional view taken along line 2—2 of FIG. 1 showing the relationship between the connecting pins and the simple band plate.

FIG. 3 is a side view of the chain link plate modified by extending the band completely around each of the pins thereby fixing the center distance between them when the chain is unloaded.

FIG. 4 is a cross-sectional view taken along line 4—4 of FIG. 3 showing the pins press-fitted into the surrounding band of the link plate.

FIG. 5 is a side view of the chain link plate further modified by the addition of buttressing material extending around the ends of the plate and enclosing the central portion of the waist of the plate.

FIG. 6 is a cross-sectional view taken along line 6—6 of FIG. 5 showing more precisely the configuration of the chain link plate resulting from the addition of buttressing material around the ends of the plate and enclosing the central portion of its waist.

FIG. 7 is a side view of the novel link plate showing the enclosed reduced central portion of the waist as spherical dimples.

FIG. 8 is a representation of the fringes appearing in a photoelastic model of a chain link plate showing the stress pattern in the plate produced by press-fitting oversize pins into the apertures of the plate, with no external load on the pins.

FIG. 9 is a representation of the fringes appearing in a photoelastic model of a chain link plate showing the stress pattern in the plate under a tensile pull applied on its press-fitted pins simulating the loaded condition of the plate in service.

FIG. 10 is a partially sectioned top view of an assembled roller chain showing two roller links each consisting of two inside (roller link) plates joined by press-fitted bushings containing the rollers, these roller links being connected together by a pin link consisting of two outside (pin link) plates joined by press-fitted pins each having one end riveted over and containing a retaining pin through its other end to prevent outward movement of the plate.

FIG. 10A is a partially sectioned view of area C of FIG. 10 showing the bell-mouth shape of the surface of the link plate aperture.

FIG. 11 is a side view of the assembled roller chain described in FIG. 10 showing more fully the contemplated plate configurations.

FIG. 12 is a cross-sectional view taken along line 12—12 of FIG. 11 of the inside (roller link) plate only, showing the configuration of the buttressing material extending around its ends.

FIG. 13 is a cross-sectional view taken along line 13—13 of FIG. 11 of the inside (roller link) plate only, showing the dimpled depressions formed by the buttress contour in the waist of the plate.

FIG. 14 is a cross-sectional view taken along line 14—14 of FIG. 11 of the outside (pin link) plate only, showing the configuration of the buttressing material extending around its end.

FIG. 15 is a cross-sectional view taken along line 15—15 of FIG. 11 of the outside (pin link) plate only, showing the configuration of the depressions formed by the buttress contour in the waist of the plate.

FIG. 16 is a cross-sectional view taken along line 16—16 of FIG. 11 of the outside (pin link) plate only, showing the configuration of the buttressing material extending around its ends and through its waist.

FIG. 17 is a partial side view of a roller chain link plate showing the most desirable grain orientation attainable in the metal of a plate in order to afford the maximum resistance to fatigue failures in service for plates formed in the conventional manner: by blanking the plates out of a strip of metal having the desired plate thickness and punching holes in the plate to form the apertures.

FIG. 18 is a partial side view of a roller chain link plate showing the grain orientation achieved by the use of a forging operation to form the plate, in which the metal is caused to flow plastically into the desired configuration and the apertures are formed by displacing metal instead of removing it.

The novel aspects and advantages of the chain link plate of this invention are best appreciated, understood, and exemplified by an analysis of the various individual features involved in developing an optimum configuration for a chain link plate which possesses a high strength-to-weight ratio with superior fatigue characteristics to give a chain composed of such plates the highest possible power transmission capacity relative to the size and weight of chain employed. These features are individually illustrated in FIGS. 1–6 and are shown in combination in the link plate 20 of FIG. 7 which basically constitutes the novel link plate configuration.

One of the features appearing in the novel plate 20 (FIG. 7) is the load-transmitting band 21 shown separately (FIG. 1) which extends around the pins or bushings 22 in the links of a chain in which the novel plate 20 is to be utilized. The band 21 constitutes the simplest method of performing the basic function of a chain plate which is to transmit forces between adjacent pins 22. This band constitutes the basic frame of any link plate and carries the bulk of the forces. If this band is not very wide, these forces will be quite uniformly distributed across the section wrapping the pins, but as the band width increases, the added material contributes proportionally less to additional load-carrying capacity, and the stresses in the material on the outside of a wide band are significantly lower than the stresses on its inner surface adjacent to the pin.

Inasmuch as the basic band link 21 has no provision for fixing the center distance between pins 22 other than the load applied to the chain, the desired center distance between the pins 22 is maintained by carrying band 21 completely around each of the pins 22 so as to encircle them (FIG. 3) thereby developing a plate 21a having apertures 24 whose contained pins or bushings 22 are fixed relative to each other by bands 23, the evolved plate 21a containing a central open portion 25. These bands 23 would not necessarily need to be as heavy as the basic link band 21 if its only function were to position the pins 22 as it would never carry any of the chain load, and it contributes little, if anything at all, to the tensile strength of the plate 21a.

The fatigue life of a chain plate can be enormously enhanced if the pin or bushing 22 is made somewhat larger in diameter than the aperture 24 of the plate 21a so that the pin or bushing 22 has to be pressed or forced into the aperture 24. This "interference fit" between the aperture 24 and its contained pin or bushing 22 creates a state of prestress in the plate material surrounding the apertures 24, in which condition the radial compressive stresses therein are accompanied by circumferential tensile stresses. These circumferential tensile stresses are favorable in that they make it possible for the plate 21a to withstand larger repeated chain loads without failing by fatigue at the apertures 24. This will henceforth be explained more completely.

The existence of this prestressed state is clearly illustrated in FIG. 8 by the unloaded photoelastic model of a chain link plate 20 containing pins 22 press-fitted into apertures 24 causing fringes 26 to appear as substantially concentric rings around the apertures 24. Each of these fringes 26 represents a definite magnitude of prestress, the fringe nearest to the apertures 24 being indicative of the highest stress while fringes further away therefrom indicate the presence of a progressively diminishing prestress level. The fact that the fringes 26 are substantially concentric with the apertures 24 signifies that the prestress distribution in a radial direction outward from the apertures is the same for all sections around the aperture. To achieve this it is necessary for the link plate to have section symmetry for all sections taken radially through the aperture centers. Hence, the material 23 (FIG. 3) added to fix the location of the pins and bushings 22 in the link plate 21a must be designed to have the same cross-section as that assigned to the portion 21 of the basic link plate 21a wrapped around the pin or bushing 22. The link plate band 21a thus formed and generally represented by portions 21 and 23 contains the thickest sections of material in the plate wherein its mass is concentrated because this material constitutes the primary load-carrying structure whose strength may be augmented by buttressing with lighter sections preferably of variable cross-section designed to add support and stiffness to the primary structure without corresponding increase in weight. In this regard, it should be noted that if radial symmetry of the link plate section around the apertures 24 is not maintained, ballizing and other operations or effects which may permanently deform the material adjacent to the apertures 24 will produce distorted apertures accompanied by differences in the extent of prestressing around the apertures and diverse prestress gradients through the material enveloping the pins or bushings 22 in which case the fringes 26 of photoelastic model 20 shown in FIG. 8 would not appear as concentric rings.

It has been stated that prestressing the link plate material around its apertures 24 with circumferential tensile stresses by forcing oversize pins or bushings 22 therein is beneficial in that such stresses improve the fatigue characteristics of the link plate 20. A brief explanation will be given to demonstrate why this is true. The familiar fatigue diagrams of Goodman, Soderberg and other recognized authorities in this field, show that the safe upper limit of cyclic stress for unlimited life of a material is increased if the lower limit of the cyclic loading is also raised. In other words, by reducing the amplitude of the fluctuating stress, the mean or static stress can be higher without damage to the material.

As applied to roller chain link plates this means that a link plate having slip-fitted pins or bushings will be subjected to very little stress around its apertures when the link is on the slack side of the chain, and to a high stress when it is on the tight side, thereby fluctuating through a relatively wide range of stress. By pressing oversize pins or bushings into the apertures, the surrounding material is placed in a state of high initial tension which exists as the link plate traverses the slack side, and which is increased only very little as the link plate travels over the tight side. Thus the stress amplitude in the material around the apertures is reduced to a very low value even though the range of chain pull on the pins is large. With slip-fit pins or bushings such a cyclic change in chain pull would subject the aperture material to a high stress amplitude which it could not long endure without failure, but when apertures are prestressed by press-fitted pins or bushings the surrounding material experiences such a small change in stress from slack to tight side that it sustains unlimited life.

Reference to FIG. 8 illustrating in unloaded photoelastic representation chain plate 20 containing press-fitted pins 22 shows that the sixth fringe order appears in the material around the apertures 24. Loading the link plate 20, as shown in FIG. 9, has increased the fringe order around the apertures 24 by only one, whereas the material in the waist portions 32 and 34 of the link plate 20 has experienced a stress change represented by at least four fringe orders. The link plate material can survive and give unlimited life over such cyclic stress ranges, but would be likely to fail after being subjected to a finite number of stress reversals ranging from zero to six fringes which would be representative of the order of magnitude of the stress amplitude around the apertures 24 for slip-fit pins carrying the same chain load. Thus the induction of circumferential tensile stresses by press-fitting the pins and bushings 22 in the apertures 24 contributes significantly to the fatigue resistance of the link plate 20.

The prestressing of link plate apertures 24 by forcing oversize pins or bushings 22 therein will now be contrasted with the operation of inducing favorable residual compressive stresses around the apertures 24 through heat treatment or by ballizing (drifting) the apertures of the link plates 20 prior to the introduction of the pins or bushings 22 in assembling link units. Such residual compressive stresses are highly beneficial to the fatigue life of the link plate 20 fitted with either loose or with pressed-in pins or bushings 22. When a drift is forced into the apertures 24 enlarging them sufficiently to cause the surrounding material to flow plastically radially outward, this material is circumferentially stretched, indicating the presence of tangential tensile stresses in excess of the yield strength of the material. Removal of the drift results in elastic recovery, the apertures 24 partially close, leaving the enveloping material in a state of circumferential compression. This principle, which dates back many years, has found wide use for strengthening cylinders and gun barrels subjected to high internal pressure.

As applied to the apertures of a roller chain plate with slip-fit pins or bushings, this implies that a greatly increased chain load can be carried without failure, because the stresses around the apertures are initially negative (compressive) and must pass through zero stress and beyond to the endurance limit of the material before fracturing. The fatigue performance of plates having residually stressed apertures containing loose-fit pins becomes comparable with that of plates having press-fitted pins in apertures which were not residually stressed. The highest fatigue characteristics are achieved by combining residual stressing produced by heat treatment or by drifting with prestressing induced by interference-fitted pins or bushings in the apertures.

Fringes 26 around the apertures 24 and fringes 33 through the waist of the photoelastic model of a chain link plate 20 shown in FIG. 9 are indicative of the magnitude of the stresses and their distribution in the link plate 20 when equal and opposite forces are applied on pins 22 press-fitted into apertures 24 thereby subjecting the link plate 20 to a tensile loading which simulates the actual operating conditions for the link plates of a chain in service. Proper analysis of the fringe pattern demonstrates that the greatest stress in the waist of link 20 occurs in its outer portion 32 while the central portion 34 thereof is almost completely unstressed, signifying that material in the region 34 contributes little or nothing to the load-carrying capacity of the link plate 20. It was noted by the inventors that the link plate 20 could therefore be made lighter, without decreasing its ability to carry load, by the removal of material in the central portion 34 of its waist using a thinner section here and appropriately graduating the thickness outwardly therefrom until it coincides with that of the basic band 21 shown in FIGS. 1, 2, 3, and 5. By so doing, all of the material remaining in the waist of the link plate 20 will be utilized more effectively and efficiently as it now becomes more uniformly stressed throughout, the basic band 21 comprising the principal load-transmitting element which is reinforced or buttressed and tied together by a buttressing web 41 whose section thickness varies substantially in accordance with the forces it is required to resist.

A similar analysis of the fringe pattern shown by FIG. 9 for the photoelastic model of a loaded chain link plate 20 demonstrates that the greatest stress in the material surrounding the apertures 24 occurs on these aperture surfaces and diminishes outwardly therefrom in radial directions to the outer edge of the plate, signifying that effective and efficient use of material decreases as this material is located radially further away from the apertures. The inventors conceived the use of a tapered buttressing section 40 (FIGS. 5–7) outside of the basic band 21, the section thickness being graduated substantially in accordance with its capacity to strengthen or buttress the basic band. It should be noted that this buttressing section 40 should have symmetry in a radial direction around the entire aperture 24 which requires its projection into the region 25 (FIG. 3) where it provides the reduced section 41 therein. The radial outward extension of the buttress supporting the basic band around the apertures is limited to the extent that interference between inner (roller) link plates must not occur in the assembled chain, and the end radius of outer (pin) link plates is restricted by the requirement that an assembled chain must be capable of containing offset (cranked) links.

Before enumerating other advantageous features of the novel chain link plate configuration of this invention, a brief review of the inventors' reasoning is given to illustrate more precisely and collectively the essential points involved in establishing a novel superior configuration for a chain link plate capable of operating in an existing chain. In this example, the aperture diameters, the thickness of the basic band, and the maximum peripheral end radii of the link plate are assumed to be those established by accepted industrial standards. The waist width is chosen to be approximately two-thirds of the maximum peripheral end radius because photoelastic studies have shown that this relationship minimizes stress concentrations in the plate.

The basic band 21 can be established as in FIG. 3. It is then provided with buttresses 40 as shown in FIGS. 5–7 which extend radially outward from the basic band 21 to the given maximum end radii and inward to enclose the central portion 25 (FIG. 3) to provide the enclosing buttressing web 41. The outer edges of the buttresses 40 on either end of the link plate 20 are blended into each other on the arc of a circle that is tangent to the outside of the basic band 21 at 32 of FIG. 5 to form the waist of the plate. Although it would not provide the lightest and most efficient link plate, it should be noted that the buttress 40 could also be extended generally straight along the waist as indicated by broken line 32a (FIG. 7).

It should be noted that filling in the central portion 25 (FIG. 3) of the waist creates reentrant angles 42 (FIG. 5) if the buttress web contour 41 is arbitrarily extended therein. As high stress concentrations would be induced in the basic band 21 by these reentrant angles, the angles have been removed to produce the preferred waist configuration shown in FIG. 7 where the buttressing web 41 appears as a dimple 43 with a spherical surface on each face of the waist. Thus the stress flow through the basic band 21 between the apertures 24 is improved. Although the presence of these dimples 43 aids in making the plate 20 somewhat lighter, the dimples also improve resilience and contribute to a better stress distribution around the apertures and through the waist, the dimples may be omitted completely in which case the waist would have a uniform thickness. Omission of these dimples may cause a moderate sacrifice in link plate performance which may be acceptable and justified economically when manufacturing difficulties make the cost of forming dimple-waisted link plates unreasonable. Although the exact shape of the section of the buttress 40 will henceforth be more precisely defined, the function of the buttress to fortify and stiffen the basic band 21 around the apertures 24 of the chain link plate 20 has been clearly demonstrated. In laboratory fatigue tests, chains assembled with link plates of this configuration displayed superior fatigue characteristics, and on dynamometer test runs they surpassed all other chain of this standard type in power transmission capacity and wear rate.

The novel chain link 20 as illustrated generally in FIG. 7 may assume other somewhat different proportions according to the particular intended utilization thereof. A typical embodiment of the novel roller chain link plate 20 may be utilized to form a chain, generally designated by the numeral 50, in a manner illustrated in FIGS. 10 and 11. It should be noted that the chain 50 is generally composed of a series of alternately interconnected roller or inner link assemblies 51 and outer flanking pin link assemblies 52.

The inner roller link assemblies 51 each include a pair of roller link plates 53 which have bushing apertures 54 formed in the ends thereof. In the embodiment illustrated (FIGS. 10 and 11) a bushing 55, having a cylindrical passage 56 therethrough, is press-fitted into adjacent apertures 54 of the respective roller link plates 53 of each of the roller link assemblies 51. A roller 57 is rotatably mounted on each of the bushings 55, between the adjacent roller link plates 53, and is adapted to be engaged by a typical chain sprocket (not shown). It should be noted that this invention is not limited to roller chain applications inasmuch as inventors' novel plate can be equally applied to rollerless chain use.

The flanking pin link assemblies 52 each include a pair of outer pin link plates 60 which have pin receiving apertures or passages 61 formed in the ends thereof. The pin link assemblies 52 are pivotally connected with the roller link assemblies 51 by a pin 62 positioned within the passage 56 of each of the bushings 55, and extending into the respective apertures 61 of the pin link plates 60. Although pins 62 are usually press-fitted into apertures 61, the pins 62 may be held in position more positively by deforming the ends thereof or by the use of retaining pins 63 inserted through the ends of the pins 62 on the outside of the pin link plates 60. Thus, it can be seen that the inner roller link assemblies 51 are pivotally connected to the pin link assemblies 52 as illustrated in FIGS. 10 and 11 to provide the continuous roller chain 50.

A buttress 65 is provided on a circular end portion 66 of the basic band of each of the roller plates. Each buttress 65 terminates by blending substantially tangentially into the top and bottom edges 67 of the basic band of the respective roller link plates 53 (FIGS. 10 and 11) at 68 in the waist of the roller link plate 53 between the respective roller link plate buttresses 65. The roller link plate buttresses 65 are substantially concentric with the respective apertures 54 and end portions 66 on the respective ends of the roller link plates 53 and are of the general cross-sectional configuration shown in FIGS. 12 and 13 which will henceforth be fully described.

A buttress 70 is provided on a circular end portion 71 of the basic band of each of the pin link plates 60. Each buttress 70 terminates by blending substantially tangentially into top and bottom edges 72 of the basic band of the respective pin link plates 60 (FIGS. 10 and 11) at 73 in the waist of the pin link plate 60 between the respective pin link plate buttresses 70. The pin link plate buttresses 70 are substantially concentric with the respective apertures 61 and end portions 71 on the respective ends of the pin link plates 60 and are of the general cross-sectional configuration shown in FIGS. 14 and 15 which will be henceforth fully described.

Side surfaces S of the roller link plate and pin link plate buttresses 65 and 70 are shown in FIGS. 12 and 14 to be substantially arcuate but these surfaces may be varied in order to provide modified buttresses depending on the nature and magnitude of the imposed loading. The arcuate surfaces S shown in FIGS. 12 and 14 are generated by the rotation of a circle of radius R about the horizontal axis H coincident with the axes of the plate apertures, the center of the circle of radius R being positioned a distance A perpendicular to axis H, and a distance B perpendicular to the vertical plane V passing through the center of the plate and normal to the axes of both apertures in the plate. The generated buttress surfaces S terminate by reversed arcs causing them to blend into the basic band tangentially as shown at 68 and 73 of FIG. 11 whereby the waist of the plate is formed. In FIGS. 12 and 14, the thickness of the basic band is shown as $t$, and the thickness of the buttress measured at a distance $r$ from axis H is shown as T. Thickness T is a variable and must be expressed as a function of $r$; thickness $t$ is a constant.

Numerous tensile, fatigue and dynamometer tests of chain composed of buttress plates have verified the theoretical stress analyses and photoelastic studies of buttress plate design so that certain relationships have been established whereby the various plate parameters may be expressed as a function of chain pitch P (FIG. 11) to provide a chain link plate configuration having an optimum strength-to-weight ratio for the plate and thereby improve the power transmission capacity of a chain composed of such plates. By way of example, a specific plate configuration will henceforth be fully described. However, it must be realized that certain deviations may be made in the proportioning dimensions to modify the plate configuration, and that such modification will still be within the crux of the invention.

For purposes of illustration only, specific equations are hereinafter offered in which the parameters A, B, R, T, and $t$ are expressed in terms of the chain pitch P. These have been found by theoretical analysis and verified by actual tests to provide plates, having about 25 percent lower mass than standard roller chain plates but capable of better power transmission performance than standard plates. In order to conform with the American Standards Association specifications for roller chains (ASA B29.1), the constant (maximum) thickness $t$ (FIGS. 12 and 14) of the roller and pin link plates 53 and 60 has been chosen for this illustration as 0.125P. Other dimensions selected and also conforming with these standards include for roller and pin link plates 53 and 60 respectively as follows: End radius=maximum buttress radius 0.47P and 0.41P; waist width 0.62P and 0.54P; aperture diameter 0.44P and 0.31P. The variable thickness T at radius $r$ from the aperture center for the buttresses 65 and 70 of the roller and pin link plates 53 and 60 has been selected to be $T=PC(r/P)^n$ where the coefficient $C=0.012$ and $0.009$ for the roller and pin link plates 53 and 60 respectively, and the exponent $n=-2.0$ for both classes of plate.

The fixed thickness $t$ and the variable thickness T as expressed in the equation form given above, were used by the inventors as a convenient means for calculating the stress distribution radially through any chosen section and are not intended to confine the shape of the section to configurations of this exact form. For layout and tool design purposes, the same shape can be closely approximated by an arc of a circle as previously noted wherein dimension $A=0.53P$ and $0.46P$, $B=0.67$ and $0.52P$, and $R=0.64P$ and $0.50P$ for the roller and pin link plates 53 and 60 respectively.

The roller link plates 53 (FIGS. 11 and 13) are provided with the dimples 43 (FIG. 7) by virtue of substantially spherical recesses 75 formed in the center of the faces 76 of every roller plate 53 (FIGS. 11 and 13). The spherical recesses 75 have a radius approximately equal to R and extend to a diameter $d$ which is preferably approximately equal to the diameter of the apertures 54. Consequently the pull or load on the chain 50 can be transmitted through the roller link plates 53 of the roller links 51 by internal forces having an uninterrupted flow through the basic band of material contained between the common outer tangents of the bushing apertures 54 of the respective roller link plates 53 and the edges 67.

It should be noted that there are portions 77 between the recesses 75 and the bushing apertures 54 which are substantially equal to the radial distances between the circular end portions 66 and the bushing apertures 54 of the roller link plates 53. This portion 77 provides a feature which was shown to be desirable for two reasons: (1) When the apertures 54 are sized or shaped by drifting, or when a press-fitted bushing 55 is inserted therein, the metal is pushed radially outward a uniform amount entirely around the apertures 54 in the manner previously described in reference to FIGS. 3–7. As a result, the center of the aperture 54 remains substantially fixed and the distance between adjacent bushings 55 is virtually unaltered, as will be fully explained henceforth; and (2) It further provides that essentially uninterrupted continuous symmetrical stress patterns can be set up in the roller link plates 53 around the apertures 54 as a result of the press-fitted bushing 55 or as a result of residual stresses induced by drifting the apertures 54 in manufacturing the roller link plates 53.

Similarly, the pin link plates 60 are provided with the dimples (FIG. 7) by virtue of recesses 80 having cylindrical surfaces with matching spherical ends formed in the center of the faces 81 of every pin link plate 60 (FIGS. 11, 15, and 16). The recesses 80 have a radius approximately equal to R and extend to a breadth $d$ which is preferably approximately equal to the diameter of the pin apertures 61 so that the pull or load on the chain 50 can be transmitted through the pin link plates 60 of the pin links 52 by internal forces having an uninterrupted flow through the basic band of material contained between the common outer tangents of the pin apertures 61 of the respective pin link plates 60 and the edges 72.

It should be noted that there are portions 82 between the recesses 80 and the pin apertures 61 which are substantially equal to the radial distance between the circular end portions 71 and the pin apertures 61 of the pin link plates 60. This portion provides a feature which was shown to be desirable for two reasons: (1) When the apertures 61 are sized or shaped by drifting, or when the press-fitted pins 62 are inserted in the apertures 61, the metal is pushed radially outward a uniform amount entirely around the apertures 61. As a result, the center of the aperture 61 remains substantially fixed and the distance between adjacent pins 62 is virtually unaltered, as will be fully explained henceforth; and (2) It further provides that essentially uninterrupted continuous symmetrical stress patterns can be set up in the pin link plates 60 around the apertures 61 as a result of the press-fitted pins 62 or as a result of residual stresses induced by drifting the apertures during the manufacture of the pin link plates 60.

In forming chain plates, apertures can be accurately sized and surface imperfections thereon can be smoothed out if an oversized ball or drift is forced through the aperture causing the metal to flow plastically outward in radial directions. Also, if the plates having drifted apertures are not subjected to heat treatment after the drifting operation, the residual internal stresses remaining around the apertures are favorable in that they improved the fatigue strength of the material adjacent to the apertures thereby allowing a chain composed of such plates to carry higher service loads. The partially tapered radial section constituting the buttress 40 surrounding the apertures 54 and 61 of the novel link plates 53 and 60 provides additional advantages from the drifting operation that are not found in conventional link plates of constant thickness. These advantages will become more apparent if the material surrounding the plate apertures is regarded as a thick-walled cylinder to which high internal pressure is applied by forcing the drift into and through the cylinder.

The effect on the shape of the apertures 54 and 61 resulting from ballizing or drifting and/or interference fitting a pin 62 or a bushing 55 in the aperture of the buttressed link plate 53 and 60 is illustrated in FIG. 10A which is an enlarged portion C of aperture 54 (FIG. 10). The portion C of the aperture 54 typically represents the novel aperture shape that can be achieved in any of the apertures of the novel link plates covered by this invention. In FIGS. 10 and 10A, 53 is the roller link plate, 55 is the bushing, and 54 is the aperture. Aperture surface D (FIG. 10A) illustrates the bell mouthed shape of the aperture 54.

Consideration will be given first to the effect of drifting in altering the shape of the aperture surface of a conventional link plate having a uniform thickness. In the conventional link plate, the metal surrounding the aperture constitutes a heavy cylinder having the same wall thickness from end to end. Consequently, the same degree of plastic flow will occur everywhere along the length of the cylinder and its internal diameter will be uniformly enlarged from one end to the other except perhaps at the two extremities where the push-out of material may be somewhat greater giving the aperture opening slightly rounded or chamfered edges.

In the buttress link plate configuration, the cylinder being expanded has a variable wall thickness (FIGS. 12–16) which is thinnest on its outer faces and becoming progressively thicker toward the middle portion where it and the cylinder previously described have equal thicknesses. If the same size drift is forced through each type of cylinder, the cylinder of variable wall thickness will have the greatest plastic flow occurring over a more extensive zone adjacent to its outer faces, to form the surfaces D (FIG. 10A) and the degree of plastic deformation will diminish progressively toward its central portion where it will be expanded only to the same extent as the first cylinder.

As the internal diameter will have been altered in varying amounts along the length of the cylinder, the aperture therein will have a distinctly "bell-mouthed" or tapered configuration D (FIG. 10A). As applied to the aperture of a chain link plate this shape is distinctly beneficial not only because it facilitates the introduction of the press-fitted pin 62 or bushing 55 into the apertures 61 and 54, but primarily because it significantly reduces stress concentrations around the edge of the apertures adjacent to the face of the link plate from which the pin or bushing protrudes. In an assembled chain link, the projecting portion of the pin or bushing outside of the plate aperture has its actual, undeformed size, but at the aperture entrance of a conventional plate the pin or bushing is forced to undergo an abrupt reduction in diameter as it goes from the free unstressed state to one of elastic compression. The edge of the aperture from which the pin or bushing protrudes is therefore a region of extremely high stress concentration making it prone or sensitive to the nucleation of plate fatigue failures.

The bell-mouthed aperture configuration D (FIG. 10A) conferred by drifting the apertures 61 and 54 in the buttress link plates causes the apertures to exert gradually increasing pressures against the contained pin 62 or bushing 55 at sections located further inside the apertures away from the link plate faces 76. The pin 52 or bushing 55, therefore is not subjected to an abrupt change in diameter, but instead experiences a gradual size transition which avoids the presence of a severe stress raiser on the edges of the apertures from which the pin or bushing projects and thereby enormously enhances the resistance of the link plate to fatigue failure.

In order to form a suitably bell-mouthed configuration D (FIG. 10A) in the aperture 54 of the chain ink plate 53, the most economically feasible method is by forcing a ball through the aperture 54 of the link plate having a variable radial breadth of material outside of the aperture. To obtain these bell-mouthed apertures in ordinary plates having a uniform radial breadth of material surrounding the apertures would require the use of a suitably tapered drift which would have to be introduced from both faces of the plates unless selective assembly were used to properly position the plates to assure that the contained pin or bushing would always project from the belled end of the aperture.

The beneficial bell-mouthed aperture can be produced in (a) link plates which are not heat treated at all, (b) link plates which are ballized or drifted after heat treatment, and (c) link plates which are heat treated subsequent to ballizing. In the latter case, exposure to the elevated temperature during heat treatment will remove any residual stresses induced around the aperture by the drifting operation, and the beneficial effects thereof derive only from the bell-mouthed configuration as heretofore described. In the first two cases, however, an additional benefit is obtained through the retention of favorable residual compressive stresses around the apertures in a highly unique and desirable pattern as will be henceforth described.

If chain link plates are used in the unheat-treated condition, the plastic deformation of their apertures by ballizing or drifting leaves a state of favorable residual stresses around the apertures improving their resistance to fatigue failure. Similar residual stresses can also be produced in heat treated plates by ballizing or drifting the apertures subsequent to the heat treating operation. After the ball or drift has passed through the aperture, the material adjacent thereto will be in a state of tangential compression, the magnitude of which will be a function of the radial breadth of material surrounding the aperture. On the faces of the buttress plate where less material envelopes the aperture, the plastic deformation is greater and the residual tangential compressive stresses likewise greater than those left in the central portion of the aperture passage where the broader section does not permit of so much plastic flow. Since the aperture edge through which the pin or bushing projects is the most vulnerable part of the passageway, the high residual compressive stresses here fortify it most effectively against the nucleation of a fatigue failure. In link plates of uniform thickness, the radial breadth of material outside of the apertures is the same everywhere along their passages, hence the residual compressive stresses induced by drifting or ballizing will be uniform from face to face of the link plate, and nowhere larger than the residual compressive stresses existent in the central portion of the passages of the buttress link plate, assuming that both types of link plates have had their apertures expanded the same amount in the middle of the passage.

Since the desirability of introducing residual compressive stresses around the apertures of chain link plates has been demonstrated, it is noteworthy that the unique configuration of this invention provides link plates 53 and 60 which will contain such stresses as a result of heat treatment. More particularly, since the link plates 53 and 60 have a variable cross-section, being thickest around the apertures 54 and 61 and tapering radially outward (buttresses 65 and 70) from the thickest portion; the thinner tapered outer portions 65 and 70 will have cooled and transformed into martensite, becoming relatively rigid during quenching while the heavier section around the apertures remains in the plastic austenitic state due to its still elevated temperature. Volume adjustments required by the phase transformation and by thermal gradients are not interfered with and no internal stresses are induced at this stage of the cooling due to the still plastic condition of the material in the region around the apertures. Subsequently, however, these heavier sections will cool through the martensite transformation temperature range and, because this phase change of austenite to martensite is accompanied by an expansion of the material, the region around the apertures will be left with residual compressive stresses as the outer elastic portion opposes this expansion. Thus, favorable residual stresses may be induced around the apertures of plates having the buttress configuration either by heat treatment or by permanently expanding the apertures by ballizing or drifting. Use of both operations would of course obtain the highest fatigue resistance in the plates.

The chain 50 containing the novel link plates 53 and 60 of non-uniform thickness of this invention is somewhat more resilient than chain comprised of uniform thickness conventional link plates. Resilience in a power transmission chain contributes to smoothness and quietness of the drive and capacity to absorb energy due to shock, impact, or impulsive loads. The added resilience in the structure embodied in this invention is attained by adding only that mass which contributes to link plate strength in the most effective manner to carry the imposed loads whereas material is not provided which contributes only to unnecessary stiffness as is provided in known types of chain.

It should be noted that the inventors' novel chain link plates 20, 53, and 60 (FIGS. 7–16) provide an additional advantageous feature resulting from the unique configuration thereof which particularly lends itself to specific grain orientation benefits to be derived from forging the link plates in the buttressed high strength-to-weight ratio configuration.

For an understanding of advantageous grain orientation feature, reference should be made to FIG. 17 that shows a partial side view of a chain link plate 85 in which the grains of the metal comprising the stamped link plate 85 are shown as dashed lines 86 all running parallel with a line joining the aperture centers. This is the most desirable grain orientation attainable when a link plate is punched or blanked from a strip of rolled stock having grains that are necessarily parallel. Blanking removes material outside of the periphery 87 while punching removes material inside the apertures 88 thereby forming the link plate 85. In so removing material to cut out the link plate 85 the grains 86 of the metal are severed reducing the strength of certain sections such as 90, but most seriously impairing the fatigue strength of the heavily loaded material on the aperture at 89 where the interrupted grain-terminals act as stress-raisers to nucleate a crack which propagates toward the periphery of the link plate until this section becomes so small that it can no longer carry the load whereupon complete break-through occurs. No plastic flow of the material is evidenced during the crack-propagation period, consequently there is no excessive elongation of the link plate or chain to warn of imminent failure. It is noteworthy that orienting the blanked link plates 85 in any other direction with respect to parallel grain lines of the strip would be less desirable that that shown in FIG. 17, as the orientation illustrated provides the most favorable condition for maximum fatigue resistance in blanked link plates.

In FIG. 18, the partial side view of a forged chain link plate 95 shows the grains of the metal comprising the link plate as dashed lines 96. In this case the blank from which the link plate is forged contains essentially only the same mass of material as that to be found in the finished link plate, the material being moved or plastically flowed into the desired configuration by the application of pressure or by hammering. It will be noted that the grains of the metal designated by dashed lines 96 are not broken through the aperture 98, but instead are continuous uninterrupted threads going through the waist and around the aperture 98 to encircle it, a condition attained in forging by forcing material in the blank to flow radially outward as the apertures 98 are formed in a closed die which confines the metal therein compelling it to assume the configuration of the die.

Any metal initially in the blank in excess of that which the closed die cavity can hold appears as a thin "flash" around the outer periphery 97 and within the aperture passages 98 of the forged link plate. This excess metal is finally removed by trimming the periphery 97 and the apertures 98. It will be noted that the forged link plate is composed of unbroken strands of metal joining the pins or bushings of a link assembly.

It is also noteworthy that the unique link plate configuration of this invention provides essentially the same cross-section of material enveloping the apertures as is contained across the waist (FIGS. 12, 13 and 14, 15) signifying that all the strands of material comprising the waist make their way continuously around the pins or bushings which they joint together in a link assembly. No grain terminals appear within the aperture passages to aggravate the nucleation of a crack which would initiate a fatigue failure of the link plate. The metal grains in the forged link plate of the inventors' configuration are oriented and distributed to conform with the pattern of tensile stresses prevailing in the link plate under load, thereby utilizing the link plate material most effectively and efficiently.

The chain link plate configuration of this invention also facilitates lubrication of the bearing surfaces between the pins 62 and bushings 55 and between the rollers 57 and bushings 55 inasmuch as lubricant applied to the chain drive has easier access to flow into the clearance space between these bearing surfaces. The tapered shape of the buttresses 65 and 70 of adjoining roller link plates 53 and pin link plates 60 shown in FIGS. 10 and 11 provides greater clearance radially inward toward the articulating joints of the chain than exists in the uniformly thin space extending from the bushing to pin link plate periphery between the adjacent flat link plates in chain of conventional design. It is also noteworthy that a chain composed of buttress link plates will receive a greater cooling effect by the passage of oil and air through the spaces between the adjoining buttresses which are effectively acting as fins to conduct away the heat generated within the chain joints on the bearing surfaces thereof.

The dimple 75 in the waist of the unique chain link plate of this invention has already been shown to improve the stress distribution therein, and to contribute to lower mass and increased resilience. Reduced material in the central part 34 (FIG. 9) of the waist provides an additional feature in improving dimensional stability of the distance P between aperture centers of the link plates. When the apertures 54 and 61 are expanded by drifting, or when a press-fitted pin 62 or bushing 55 is inserted therein, the material surrounding the apertures is moved radially outward in all directions from the aperture centers. Conditions under which this outward flow of metal influences the aperture center distance or pitch P of a link plate can be most readily appreciated if the link plate is considered to consist of a pair of washers joined by welding a single short narrow band of material to each washer on a line passing through their centers. Any outward radial movement of material in the washers against the band will force the washer centers further apart. If, however, the washers are joined as in FIG. 3 by a pair of bands 21, radial movement of washer material will change the distance between the bands themselves, but the distance between the centers of the washers will remain unaltered. This simple analogy demonstrates clearly that a chain link plate should have a minimum of material in the center of its waist in order that the pitch of the link plate will remain fixed even when its apertures are expanded by forcing pins or bushings therein to make a link assembly, or by manufacturing operations which plastically deform the material surrounding the apertures.

It is to be understood that the invention is not to be limited to the specific construction and arrangements shown and described, except only insofar as the claims may be so limited, as it will be understood to those skilled in the art that changes may be made without departing from the principles of the invention.

What is claimed is:

1. A power transmission chain link element comprising a link plate having a waist portion and apertures formed laterally through end portions of said link plate for receiving a connecting pin to pivotally interconnect adjacent pairs of said plates to form a continuous load transmitting chain, said end portions each having a cross section passing through the axis of the aperture having one portion of uniform thickness extending radially outward from the aperture and another portion having a uniformly tapered section centered on the axis of the aperture and radially beyond the uniform thickness portion thereof, said waist portion interconnecting said end portions, said waist portion extending between parallel common tangents to the uniform thickness end portions and having a maximum thickness equal to the thickness of said uniform end portions throughout the length thereof, said waist portion having a single curved and continuous indentation formed in each side thereof in the waist portion extending between parallel common tangents to the end portion apertures and the uniform thickness portions of the ends.

2. A power transmission chain link element as defined in claim 1 wherein the apertures in said end portions have a bell-mouthed configuration adjacent the openings thereof on each side of the link plate.

References Cited

UNITED STATES PATENTS

| | | | |
|---|---|---|---|
| 1,979,592 | 11/1934 | Weiss | 74—250 X |
| 1,994,840 | 3/1935 | Thoen | 74—245 X |
| 2,075,546 | 3/1937 | Rinagl. | |
| 2,155,584 | 4/1939 | Bryant et al. | 74—250 |
| 2,182,443 | 12/1939 | McAninch | 74—245 |
| 2,246,810 | 6/1941 | Nicolai | 74—250 |
| 2,566,678 | 9/1951 | Riegel et al. | |
| 2,589,887 | 3/1952 | Sprague | 74—245 |
| 2,831,360 | 4/1958 | Couper | 74—245 |

FOREIGN PATENTS 733,961 7/1955 Great Britain.

FRED C. MATTERN, Jr., *Primary Examiner.*

DAVID J. WILLIAMOWSKY, *Examiner.*

J. A. WONG, *Assistant Examiner.*